United States Patent

[11] 3,549,811

[72] Inventor Einar Borresen
Langmyrgrenda 28C, Oslo, Norway

[21] Appl. No. 866,106
[22] Filed Oct. 7, 1969
Continuation of Ser. No. 560,744, June 27, 1966, now abandoned.
[45] Patented Dec. 22, 1970
[32] Priority July 3, 1965
[33] Norway
[31] No. 158,788

[54] RADIO TRANSMISSION SYSTEM
4 Claims, 7 Drawing Figs.

[52] U.S. Cl. .................................... 179/15, 325/50
[51] Int. Cl. .................................... H04j 1/00
[50] Field of Search .................................... 179/15ASYNC, 15SIG, 15SSB, 15P; 325/49, 50

[56] References Cited

UNITED STATES PATENTS 2,778,877 1/1957 Caruthers .................... 179/15P

*Primary Examiner*—Ralph D. Blakeslee
*Attorney*—Young & Thompson

ABSTRACT: Suppressed carrier, single sideband frequency division multiplex system with auxiliary signalling and masking frequencies mixed with channel signals in transmission.

INVENTOR

EINAR BØRRESEN

BY Young + Thompson

ATTORNEYS

INVENTOR

EINAR BØRRESEN

BY Young + Thompson

ATTORNEYS

INVENTOR

EINAR BØRRESEN

BY Young + Thompson

ATTORNEYS

INVENTOR

EINAR BØRRESEN

BY Young & Thompson

ATTORNEY

INVENTOR

EINAR BØRRESEN

BY Young & Thompson

ATTORNEYS

INVENTOR

EINAR BØRRESEN

BY Young + Thompson

ATTORNEYS

RADIO TRANSMISSION SYSTEM

This application is a continuation of Application No. 560,744, filed Jun. 27, 1966, now abandoned.

The present invention relates to a radio transmission system which makes it possible to transfer signals for instance in the VHF and UHF bands, which require high frequency accuracy. Thus the system may be used for selective calling of a great number of receivers,—2 to 3 million per channel—, and in which the code frequencies used, of the order of 100 to 200 kilocycles, may be reproduced in the receivers without frequency error. The system is also suitable for single sideband radio communication systems in VHF and UHF. The system may further be used in such cases where it is desired to transfer signals on channels which should be given a certain degree of protection against unwanted listening in.

For a radio paging system which for example should be connected to the public telephone network, for selective calling of a great number of receivers in autocars etc. it is difficult by usual AM and FM technics and the channel widths now commonly used, to obtain sufficient traffic and number capacity.

In the fixed and mobile VHF and UHF radio communication services it has been difficult to utilize single sideband communication systems due to the high degree of frequency stability required for such systems.

As to the said transmission system where the message channels should have a certain degree of protection against unwanted listening in, this may for example concern a unidirectional, multichannel transmission system through which reports to different links of business organizations or associations may be sent,—such protection may be difficult to obtain in a simple way when traditional AM or FM systems are used.

The object of the present invention is to provide a radio transmission system in which the difficulties mentioned are surmounted. In this system the transmission from a main or central transmitter consists of at least one signal frequency or signal frequency band and an unmodulated auxiliary frequency wave common to all signals or signal bands and comparable in power to the power of each signal frequency or signal band, which auxiliary frequency wave is produced by a stable low frequency generator and raised in frequency by means of the conversion frequencies also used for converting to the transmitter output frequency the initial low frequencies or low frequency signals to be communicated, and wherein in the receivers included in the system the received, auxiliary frequency and the signal frequencies or signal bands, after being converted to lower frequencies are separated and amplified individually, whereafter the auxiliary frequency by heterodyne action together with the signal frequencies or signal bands is used to produce a spectrum of signals comprising one set of sideband signal frequencies or signal bands having frequency levels free from errors introduced by the oscillator frequencies applied for the common frequency conversion of the auxiliary frequency and the signal frequencies or signal bands, and lastly the signals in said sidebands are extracted in one or more filters and fed, alternatively after conversion by means of a relatively low frequency, to the receiver output.

For selective calling, according to the invention, the code frequencies and the auxiliary frequency are produced by first generating a set of frequencies equal to the difference between the code frequencies and the code frequency band limit lying nearest to the auxiliary frequency; and then by mixing this set of frequencies with a first conversion frequency equal to the difference between said frequency band limit and the auxiliary frequency, and filtering the upper sideband resulting from the mixing process and the first conversion frequency from the rest of the mixer output and converting these frequencies in one or more frequency changer stages to the transmitter frequency, wherein in the transmitter spectrum thus produced the transposed first conversion frequency constitutes the auxiliary frequency and the transposed set of frequencies constitutes the code frequencies. Line 23 and 24 should be: "Modulation in the normal understanding of this term does not take place in this process, and in the receivers." It can here not be spoken of modulation in the normal understanding of this term, and in the receivers there is no LF stage, as the output signals have frequencies of the order of 100—200 kilocycles.

In the receivers according to the invention, the frequency differences between the auxiliary frequency and the code frequencies are derived and supplied to selective filters the output signals of which, after amplification if necessary, and rectification are supplied to a decoder producing by correct code combination an acoustic and/or a visible signal. Crystals are used as selective decoding elements in the receivers.

If each code combination is made to consist of four frequencies transmitted simultaneously, and a separation of 250 cycles between adjacent code frequencies is employed, 80 code frequencies may be placed within a 20 kilocycles band, which means that 1.4 million different code frequency combinations will be obtained. Correspondingly in a 25 kilocycles band 3.9 million code combinations would be the result.

The duration of a call may be made as short as 50—100 milliseconds, resulting in a traffic capacity of more than 30,000 calls per hour.

If the code frequencies are transmitted in sequence, the sequential order may be used as a criterion for selection. Thus a sequential system will give more code possibilities than a simultaneous system with the same number of code frequencies. In a sequential system with 58 code frequencies, in which four frequencies in addition to an auxiliary frequency form a call, 10 million different code possibilities will be obtained.

In the radio transmission system according to the invention, for communication between a main station and substations, information is transmitted as single sideband signals. In the substations the received auxiliary frequency is used for demodulation as well as for producing in combination with the conversion frequencies generated in the receiver, the transmitter frequency. In this way the transmitter frequency is produced with great accuracy. In the main station the auxiliary frequency necessary for reception of the signals from the substations is produced locally.

One object of the radio communication system may be to establish frequency saving public central stations with great traffic capacity. From the central stations connected to the public telephone network, there may be transmitted one or more 12 channel groups, and mobile stations may work in all channels within a group.

As another example may be indicated that a 12 channel main station be at the command of a number of users leasing their own line to the main station and disposing of one or more channels, possibly shared with other subscribers. Several such main stations with a common constant increasing number of private base stations.

For transmission of signals on single sideband channels from a multichannel transmitter to groups of one-channel crystal-controlled receivers, one receiver group for each transmitter channel,—the channels shall according to the invention overlap in such a way that the band limits of two neighboring channels are separated by a frequency space less than the channel band width, and signals on a minimum of two channels, separated by at least one channel band width, should be transmitted simultaneously. In this way it will be possible, within a comparatively narrow frequency band, and after a suitable schedule, to transmit different messages on different channels to groups of receivers, in number corresponding to the number of channels, and signals will be legible only in the receivers for which they are intended.

If a particularly low intermediate frequency is chosen in the receivers, one intermediate section may be omitted in the receivers and in this way a simple receiver construction is possible.

The receivers local oscillator frequency is then chosen either from the frequency spectrum between the auxiliary frequency and the message channels band, or from the frequency range below or above the complete received spectrum including the auxiliary frequency and the message channels band, as in normal practice. In the first case the sum of the converted auxiliary frequency and the converted message channel concerned is utilized for recovering the signals transmitted in the channel, in the second case the difference between the auxiliary frequency and the channel concerned is, after conversion, utilized for recovering the information in the channel.

Since it is difficult to obtain sufficient image frequency suppression when the receivers first intermediate frequency is low, frequencies equal to the image frequencies can not be used for transmission in areas where receivers of the type described are used. In a transmission system including a transmitter radiating signals on more than one message channel or channel bands, or transmitters working on adjacent channel bands, and receiver groups of this type, each group for example constructed for reception of signals only within one of the transmitted channel bands,—the frequencies for the channel bands and the receiver oscillator frequencies may be chosen so that the channel band's image frequencies for two or more groups of receivers are made to coincide or substantially coincide in the frequency spectrum.

Some examples of embodiment of the invention are shown below, and will be explained with reference to the drawings.

FIG. 6 shows a block diagram of a receiver to be used in a unidirectional transmission system wherein channels are protected from unwanted listening in.

Figures 1, 7:
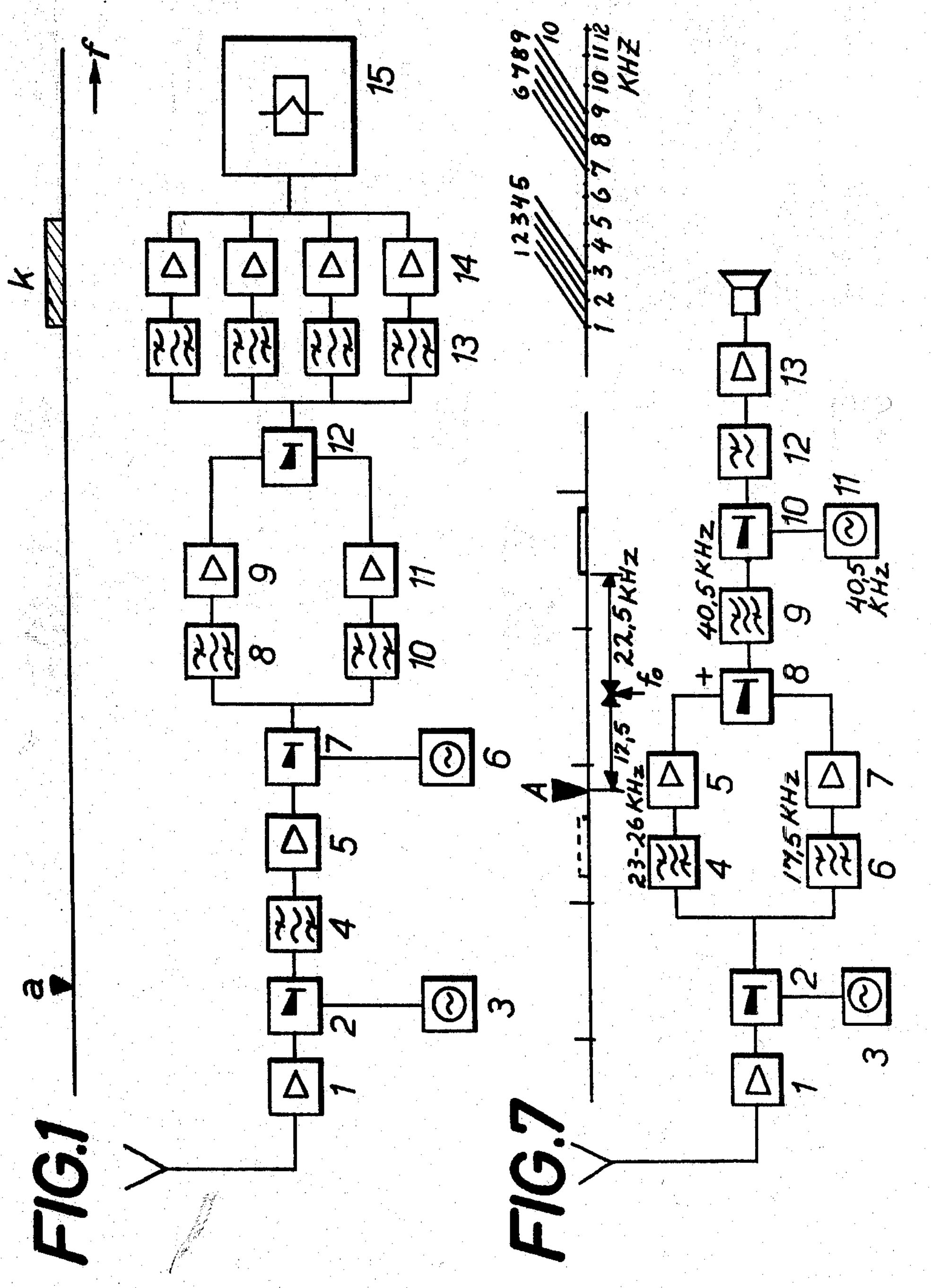
FIG. 1 shows a block diagram of a receiver in a system for selective calling, according to the invention, and further a frequency plan for this system.
FIG. 7 shows a block diagram of a receiver for single sideband reception, offering a certain degree of protection against listening in, and its corresponding frequency plan.

The system for selective calling shown in FIG. 1 comprises one or several transmitters which may be connected to the public telephone network, and a number of receivers, which may be portable or installed in autocars or other vehicles.

Each receiver shall react to only one special code. The output frequencies of the receiver are of the order of 100 to 200 kilocycles, crystals with resonance frequencies within the said range are used as selective elements for the decoding.

FIG. 1 shows further a frequency plan with an auxiliary frequency *a* and a code frequency band K. A call to a receiver consists for instance of four frequencies within the band K and the auxiliary frequency *a*.

In the receiver the signals are converted to lower frequencies. After stage 7 the auxiliary frequency will be approximately 450 kilocycles, and the frequencies within the band K approximately 550 kilocycles.

The auxiliary frequency is extracted in filter 10 and the code frequencies in 8. After amplification the auxiliary frequency from filter 10 is mixed with the code frequencies in the stage 12. The crystal filters 13 are tuned to the frequency difference spectrum emanating from stage 12.

Since the same frequency error have been accrued to all frequencies during the frequency conversion process in the receiver, the difference between the auxiliary frequency and the code frequencies will be free of error. After passing of the filters and amplifiers 14, the signals are rectified and supplied to the decoding unit 15, where an acoustic and/or visual signal is generated when the correct code combination is received.

Figure 2:
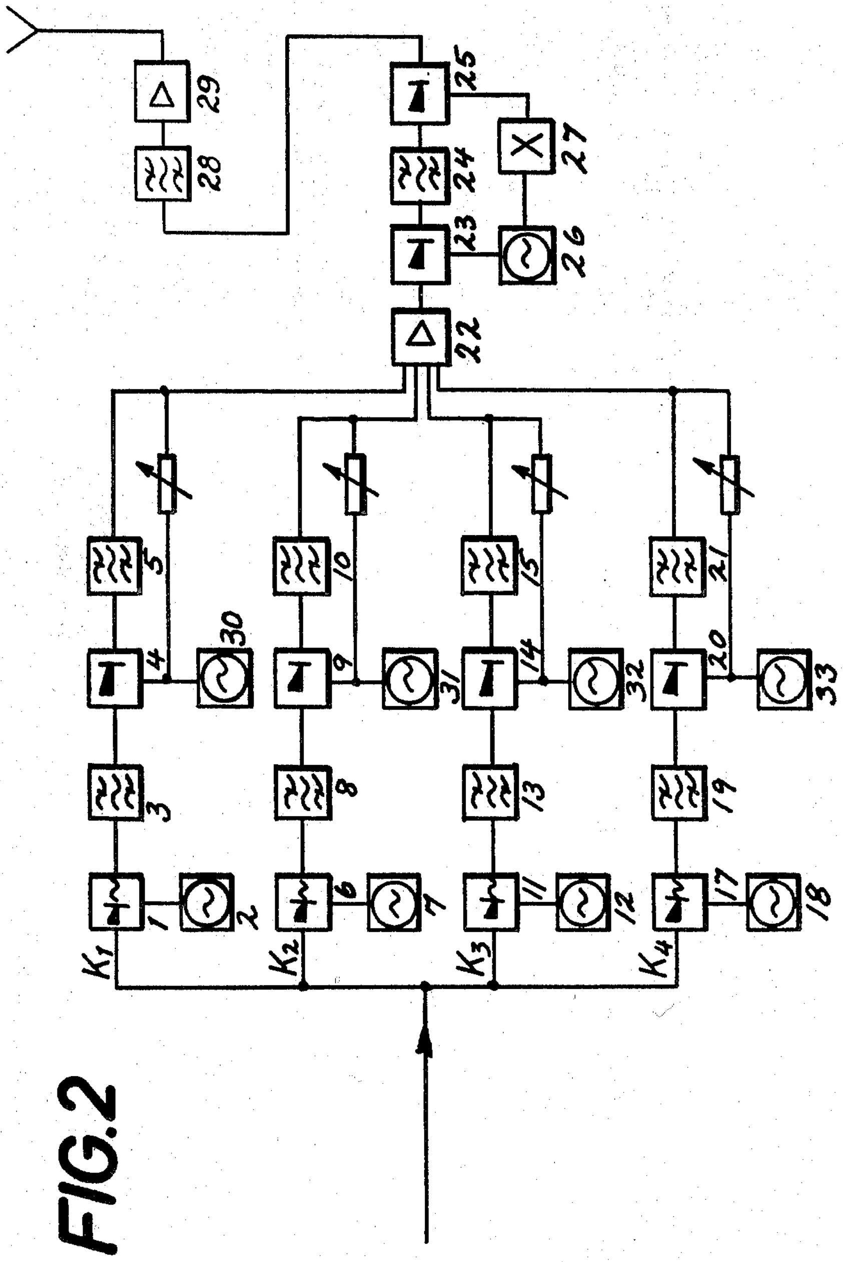
FIG. 2 shows a block diagram of a four-channel transmitter for selective calling.

FIG. 2 shows a block diagram of a four-channel transmitter for selective calling.

The channel code frequencies are supplied to the channel to be used. The four channels are fundamentally analogous and therefore it is sufficient to explain the working of one of them. In the balanced modulator 1 the channel code frequencies are mixed with the frequency from oscillator 2, approximately 100 kilocycles, and the frequency sum is extracted in filter 3, while the oscillator frequency and the lower sideband are suppressed.

A channel code frequency means the difference between the code frequency and the K-band limit lying nearest to the auxiliary frequency.

In stage 4 the output from filter 3 is mixed with a frequency *fo*2, for example 3 megacycles, and the upper sideband is extracted in filter 5. The oscillator frequency *fo*2 is not to be suppressed, and a possible attenuation of the *fo*2—wave is compensated by the reintroduction of this wave after filter 5. After conversion the *fo*2 has become the auxiliary frequency. At this stage, the auxiliary frequency and the code frequencies are at this stage placed in a correct position to one another. In the succeeding stages the signals are further converted to the desired transmitting frequency and supplied to the output stage 29.

Figure 3:
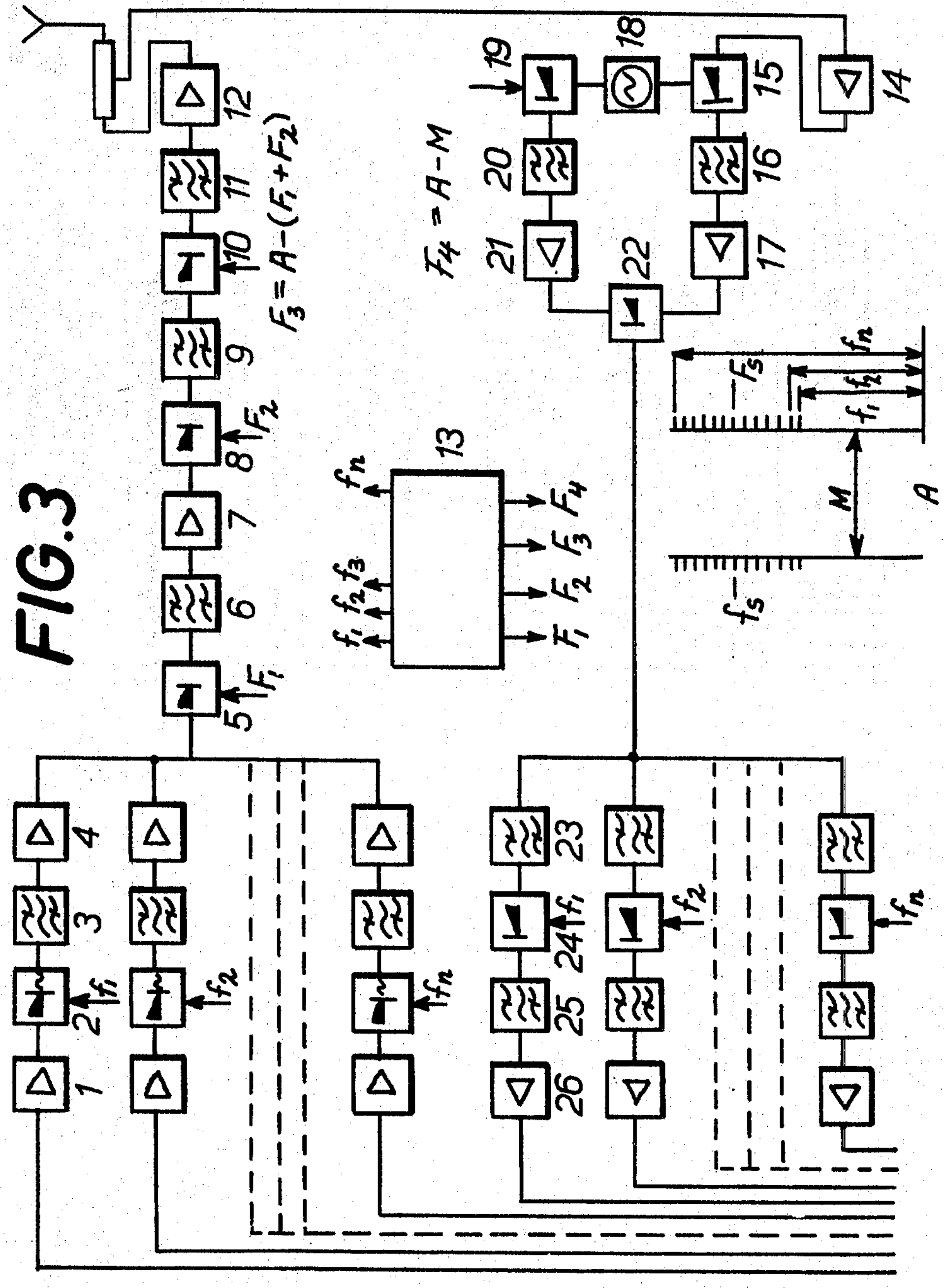
FIG. 3 shows a block diagram of a main transmitter for communication with a number of substations.

FIG. 3 shows the principle of a main station for communication with substations. The first part of the transmitter is largely a carrier frequency equipment, in which 12 single sideband of 4 kilocycles each, and with carrier frequencies *f*1 to *fn* are generated. All carriers are suppressed after the filter 3.

The signals from the twelve channels are mixed in stage 5 with the frequency F1 of approximately 1 megacycle. The lower sideband is suppressed in filter 6. F1 is not suppressed but reintroduced after filter 6.

F1 constitutes the auxiliary frequency and is now correctly positioned in relation to the speech channels. In the remaining transmitter stages the signals are converted to the desired output frequency channel, and thereafter fed to the output stage, 12.

In FIG. 3 below, a frequency plan for the system is shown. The auxiliary frequency is referred to as A. A substation does not transmit an auxiliary frequency but only the signals to be conveyed on a single sideband channel at a frequency interval M from the main station transmitting channel employed for the particular communication concerned. The substations do not transmit the auxiliary frequency, but only the speech channels in the form of single sideband in a distance M from the transmitting channels.

The band between the auxiliary frequency and the information channels may be used for other purposes.

In stage 15 the signals from the substations are mixed with a frequency from the generator 18. The frequency from generator 18 is also mixed in stage 19 with F4 = A − M, which is derived from the transmitters auxiliary frequency A. In the filters 16 and 20 the lower sideband is extracted. The converted signals from the stages 16, and 17 are then mixed in stage 22 with the frequency derived from the stages 20, and 21 and the spectrum of difference frequencies is extracted in the filters 23, one for each speech channel.

By this process the frequency errors from the oscillator 18 are eliminated. As the transmission frequency in the substations also is derived from the frequency A, the speech channel signals accuracy. In stage 24 the output from filters 23 is further mixed with the substitute carriers *f*1 to *fn* respectively, in accordance with the succession of speech channels, whereby the modulation frequencies appear.

Figure 4:
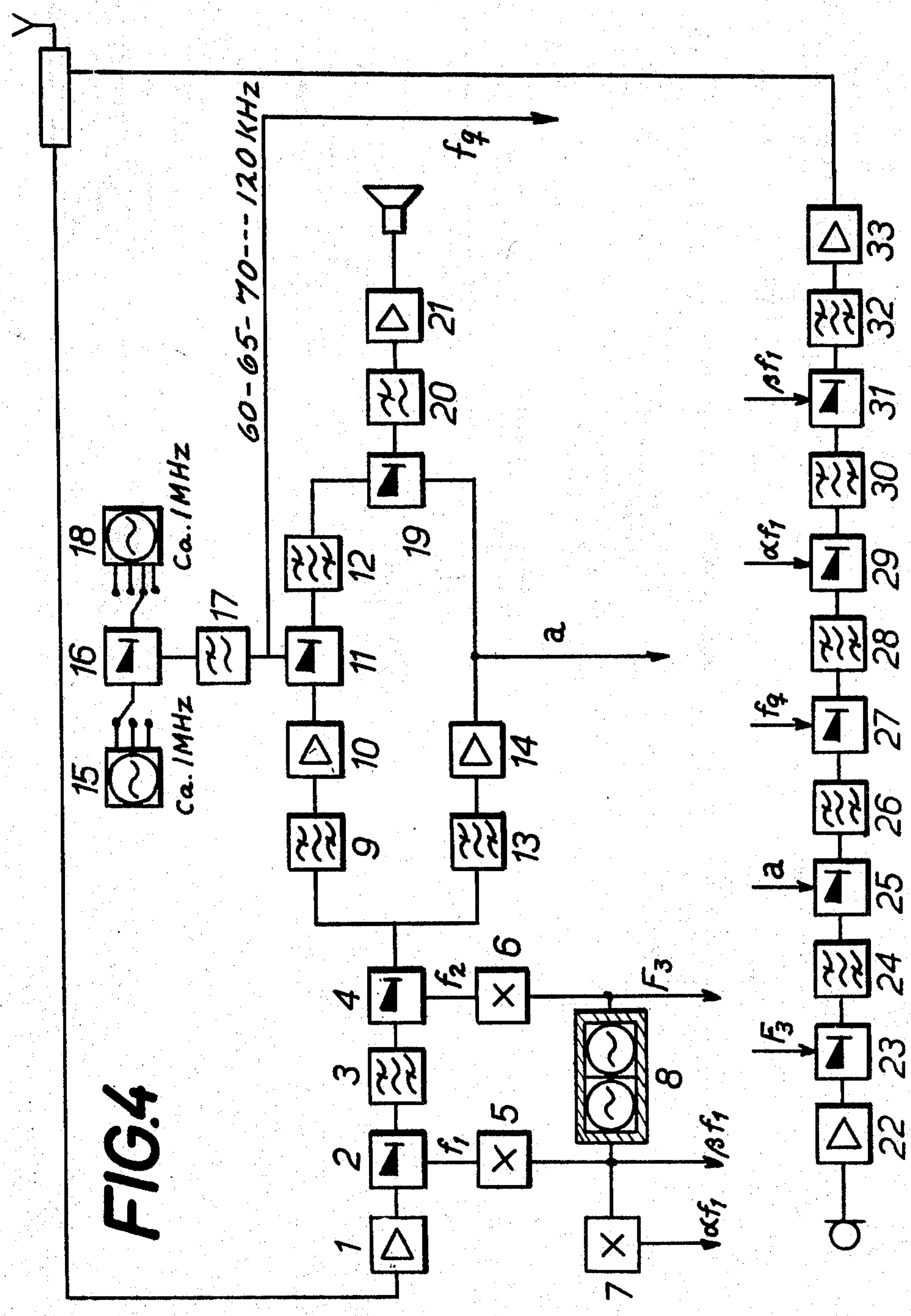
FIG. 4 shows a block diagram of an embodiment of a substation for communication with a main station as shown in FIG. 3.

FIG. 4 shows an embodiment of substation. In the stages 2 and 4 the signals are converted with the result that the auxiliary frequency is changed to approximately 450 kilocycles, and the speech channels, supposed to have a width of 5 kilocycles, to 510 to 570 kilocycles. The speech channel band is extracted in filter 9 and mixed for example the channel occupying the band from 510 to 515 kilocycles is desired, the output from stage 10 is mixed with *fq* = 60 kilocycles, whereby the desired channel is converted to the band 450 to 455 kilocycles. Filter 12 may have a bandwidth of 2.1 to 2.5 kilocycles plus an addition necessary for frequency tolerances. The frequencies denoted by $fq$ are obtained from a set of generators, or from a generator arrangement as indicated in FIG. 4, or from other suitable known means of frequency generation.

In filter 12 the signals from the channel converted to 450—455 kilocycles are filtered from the signals in the other channels. The converted auxiliary frequency, $a$, is extracted in the stages 13 and 14, and used for demodulation of the signals from filter 12 in stage 19. The frequency error due to the conversion in the stages 2 and 4 is thereby eliminated.

The transmitter frequency from the substation should be:

$$fs=A-M+fq$$

where M is the frequency interval between the transmitting frequency and the receiving frequency. A is the auxiliary frequency and may be reproduced in the substation without any frequency error. From the conversion process in the receiver may be seen that:

$$A=a+f1+f2$$

where $f1$ signifies the first, and $f2$ the second conversion frequency in the receiver. The transmitter frequency may then be written:

$$fs=a+f1+f2-M+fq$$

If $f2 = M + F3$, where F3 is the first conversion frequency in the transmitter, a new expression for $fs$ is obtained:

$$fs=a+F3+M-M+fq$$

or $$\underline{fs=a+f1+F3+fq}$$

From this it will be seen that the transmitter frequency is derived from the auxiliary frequency, A, combined with the frequencies M and $fq$. As M and $fq$ are small compared with A, $fs$ may be produced with a high degree of accuracy. Typical values of the frequencies mentioned may be: M from 4.5 to 8 Megacycles, $fq$ from 100 to 200 kilocycles, while A is a frequency in the VHF or the UHF bands.

Figure 5:
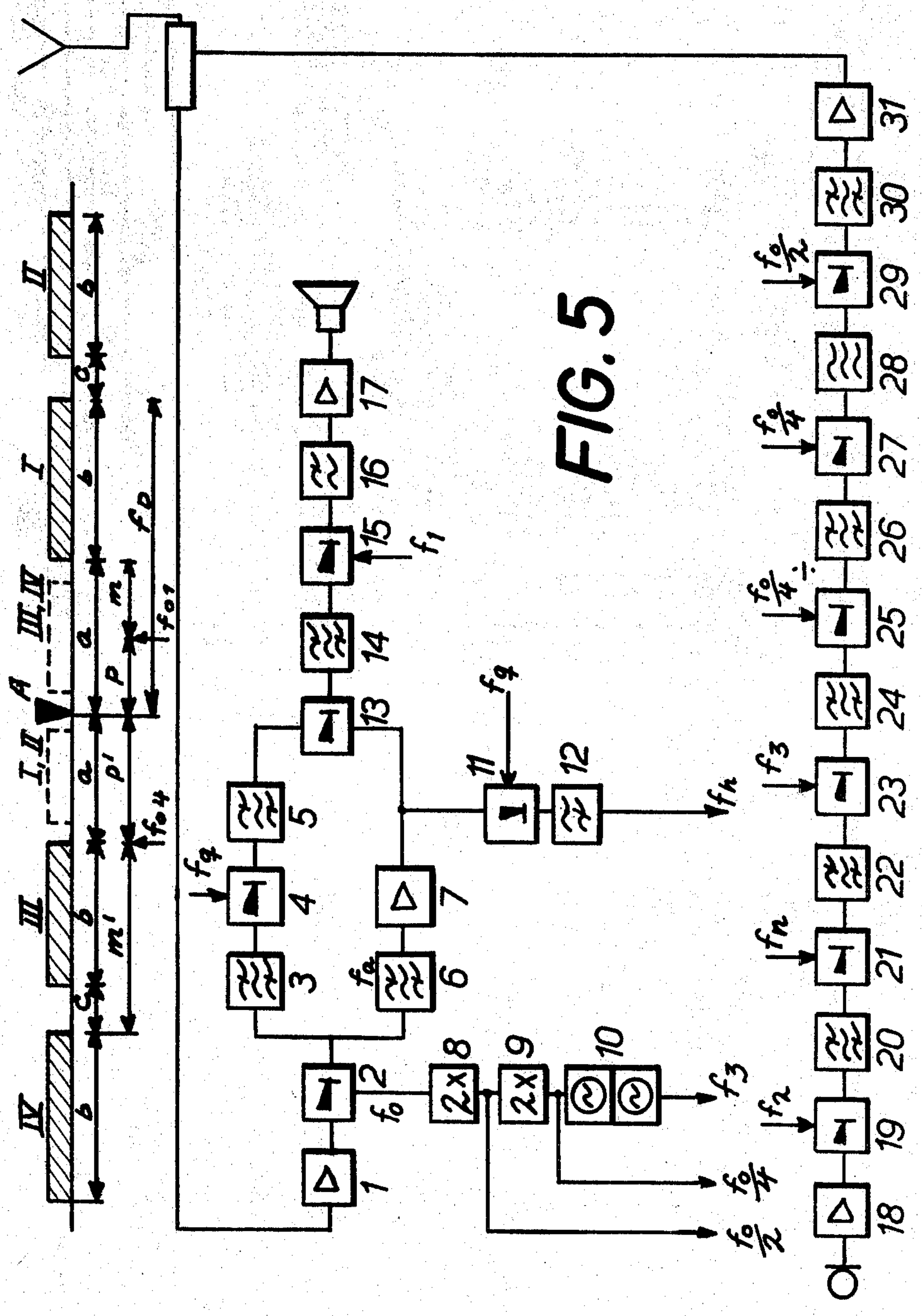
FIG. 5 shows a block diagram of another embodiment of a substation, as well as a frequency plan for this application of the system.

FIG. 5 shows another embodiment of a substation using a receiver with a particularly low intermediate frequency. A frequency plan for this application of the system is also shown in FIG. 5. The plan is based on a common auxiliary frequency, A, and four transmission bands I, II, III and IV, containing for instance 12 channels each. A substation is supposed to have its receiving channels within one of the transmission bands. The receiver shown is intended for reception of signals in band I.

The oscillator frequencies in the substations receivers must be selected so that e.g. the message channel's image frequencies of a band II receiver coincide with the corresponding image frequency band of a band I receiver, while the image frequencies of the auxiliary frequency. A comes outside the transmission bands.

In FIG. 5 the oscillator frequencies $fo1$ and $fo2$ for the two receivers are indicated and the receivers common image frequency band is marked I′, II′.

In the receiver the message band Fs and the auxiliary frequency are converted, thus:

$$Fs-fo=ft$$

$$fo-A=fa$$

The frequency $fa$ is extracted in filter 6. The signal band, $ft$, is filtered from the rest of the spectrum in filter 3 and mixed in stage 4 with the channel frequency $fq$, whereby the desired speech channel will be corresponding in frequency to the passband of filter 5. The channel frequencies $fq$ may be obtained from a set of generators 32 or from other suitable and known methods of frequency generation.

In stage 13 the separated speech channel signals are mixed with $fa$, the converted auxiliary frequency, the sum of the mixing product extracted in filter 14, whereby the error from the oscillator frequency $fo$ is eliminated. The signals appearing after the mixer 13 will thus be at a correct and fixed frequency level substantially free from frequency error. Filter 14 may therefore be very narrow. In stage 15 the output of filter 14 is demodulated by means of the fixed conversion frequency $f1$ supplied from generator 32 and thereby the speech band is derived.

The substations transmitter is largely of the type previously explained. The transmitter frequency is produced, as indicated in FIG. 5 from stage 18 to 31:

After amplification in stage 18 the LF signal modulates the frequency $f2$ in stage 19. $f2$ may be of the order e.g. 50 to 100 kilocycles. In stage 20 the upper sideband is extracted, which in stage 21 and the upper sideband filter 22 is transformed in frequency by $fh = fa + fq$. This frequency contains the frequency error from $fo$, the receiver's first conversion frequency. Since $fq$ varies in frequency in accordance with the speech channel, the bandwidth of filter 22 must in this example be 48 kilocycles.

In stage 23 and in the upper side band filter 24 a further frequency conversion is made by means of $f3$, the magnitude of this frequency is given below.

In stage 25 the signal is transformed by $fo/4$, derived from the receiver's first oscillator frequency. Filter 26 is tuned to the lower side band of the modulation product from stage 25. The lower limit of the signal band passing 26 is thus:

$$fo/4-(f2+fh+f3)$$

In stage 27 and 29, and in combination with the upper sideband filters 28 and 30, the signal is transformed to the transmitter frequency by $fo/4$ and $fo/2$, and in stage 31 the signal is amplified and applied to the arial circuit.

If F′s and $f's$ denote the lowest frequency limit of the particular speech channel under consideration, respectively from the main station and from the substation,—the two frequencies should be related so that:

$$f's=F's-M$$

M is the difference between the main station and the substation transmitter frequency. The conversion process in the substations transmitter as outlined above gives:

$$f's=fo-(f2+fh+f3)$$

Where $fh = fa + fq$ as shown in FIG. 5. The frequency $f3$ is chosen so that:

$$f3=M-fD-f2$$

The frequency $fD$ is shown in the frequency plan as the difference between the upper limit of the band I and the auxiliary frequency A, $fD$ may, however, be chosen arbitrarily provided $fD$ is made greater than the difference mentioned. The relation between $fD$ and $fq$ is:

$$fD=fq+(F's-A)$$

When the expressions for $f3$, $fD$ and $fh$ is inserted, the equation for $f's$ may be written:

$$f's=fo-(fh+M-fD)=fo-(fa+M-F's+A)$$
$$=F's-M+(fo-A)-fa$$

since $fo - A = fa$ the result of the frequency conversion is: $f's = F's - M$ which is in accordance with the requirements above.

Figure 6:
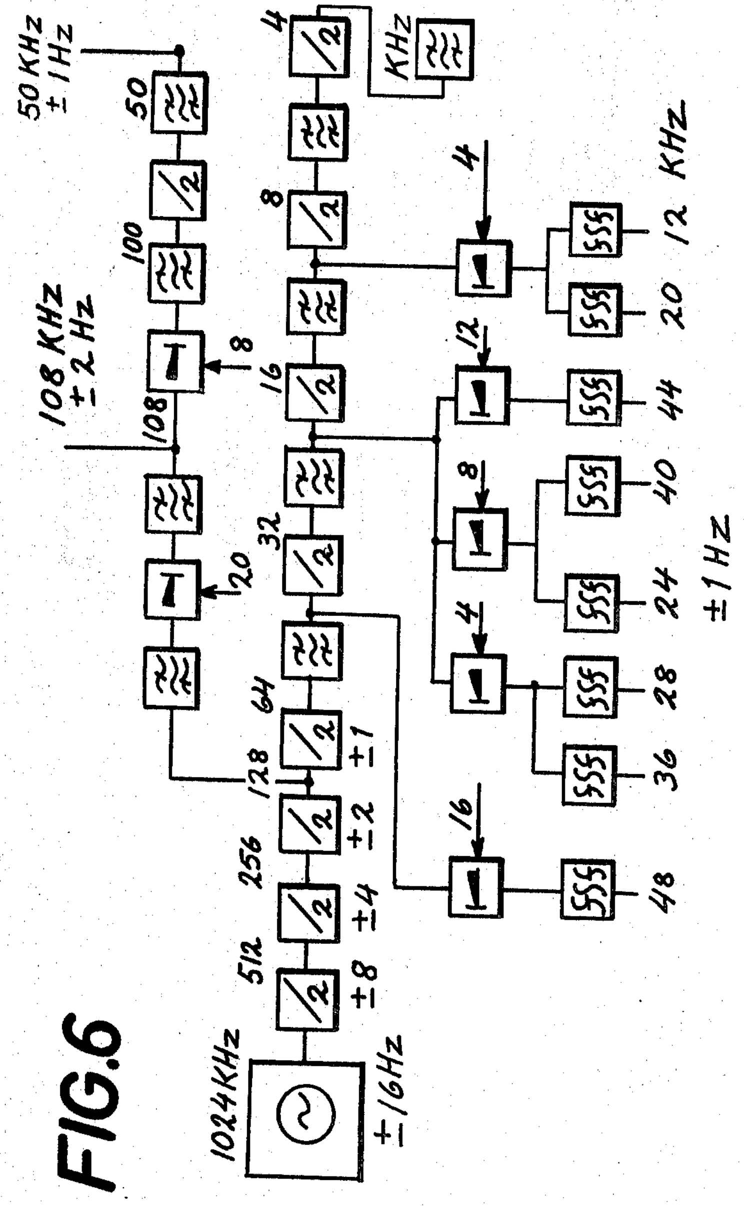

FIG. 6 shows a receiver for single side band reception designed for use in a unidirectional transmission system including a multichannel single sideband transmitter and receiver groups, one for each transmitter channel, and in which system the channels should overlap in such a way that the band limits of two neighboring channels are spaced e.g. only 500 cycles apart. The object of this is that signals picked up by a receiver should only be legible when transmission takes place on the correct receiver channel. Adjacent channels may be heard in a receiver of this system, but the signals are heavily distorted and difficult to read.

The frequency plan in FIG. 7 is fundamentally analogous to the one shown in FIG. 5, but should now be considered as concerning one single transmission band. This band is separated from the auxiliary frequency by a frequency interval of 17.5 plus 22.5 kilocycles and includes 10 channels. The transmission band is shown in an amplified scale to the right of the frequency plan. The channels indicated are marked with the numbers 1 to 10.

The principle of the receiver's operation is largely as explained for the receivers shown in FIGS. 4 and 5. The receiver's oscillator frequency is in this example chosen from the spectrum of frequencies between the channel band and the auxiliary frequency, which means that the sum of the auxiliary frequency and the speech channel, or in other words the upper sideband, in the output of mixer stage 8 must be used to obtain a signal free from the frequency error due to oscillator 3.

If the oscillator frequency, *fo* had been chosen outside the complete received spectrum including the auxiliary frequency and the transmission band, the lower sideband of the mixer product from stage 8 had to be used. The receiver shown in FIG. 6 is constructed for reception of channel 2. This may be seen from the frequency values indicated for filter 4, filter 9, and oscillator 11. The receiver channel thus depends upon the filters 4 and 9 as well as the frequency of oscillator 11. For this reason it will not be sufficient to change the oscillator frequency in order to obtain access to all the channels included in the system.

Receivers to be used in surroundings where the ambient temperature is relatively constant may be equipped with an oscillator, marked 11 in FIG. 6, of the LC-type working on a fixed frequency, but fitted with a knob for fine frequency adjustment to compensate for frequency drift.

I claim:

1. A radio transmission system adapted to accomplish communication between a base station and a plurality of substations, comprising in the base station transmitter means for providing a transmitted signal which includes a plurality of voice message signals and one unmodulated auxiliary frequency signal, a said transmitter means including a plurality of message signal channels each adapted to receive a voice frequency signal, means of generating a set of low frequency carrier signals—spaced in frequency—one particular designated to each message channel, each of said message channels including a balanced modulator to receive and mix the voice frequency signal and the carrier designated to the channel, filter means connected to said balanced modulator operating to suppress said carrier frequency and one of the sidebands of the mixed output from the balanced modulator, means to produce an unmodulated signal—the frequency of which has a fixed and stable relation to said carrier frequencies—a first mixer means to receive all the signals from said message channels and mix with the unmodulated frequency signal, filter means connected to said first mixer operating to extract one of the sidebands and the unmodulated frequency signal from the output of said first mixer, generator means to produce a set of conversion signals very accurate and stable in frequency, conversion means connected to receive and increase by means of the same conversion frequencies the frequencies of the message channel signals and the unmodulated frequency signal—the latter after being increased in frequency constituting the unmodulated auxiliary frequency in the transmitter's output signal—, means to transmit said message signals and auxiliary frequency signal, said transmission system comprising in the substations means for receiving the voice message signals and the auxiliary frequency signal from said base station, said receiver means including conversion means connected to receive and decrease the frequency of said received signals including the auxiliary frequency signal, filter means connected to the output of said conversion means operating to separate the auxiliary frequency signal from the message channels, filter means to extract the message channels, means for separately amplifying the auxiliary frequency signal and the message channel signals, means for generating a set of low frequency signals—one particular designated to each message channel and equal to the frequency difference between the auxiliary frequency and the frequency corresponding to the channel's suppressed carrier frequency in the base station's transmitted signal—, mixer means connected to the message channel amplifier for receiving the message signals and mix with one of the said low frequency signals designated to the message channel to be selected, band pass filter means connected to said mixer, said band pass filter having a band width equal to the band width of a message channel plus an additional guard band corresponding to the maximum estimated signal frequency error which may be accrued during the transmission process in the base station transmitter means and in the stages of the substation's receiver preceding said band pass filter, said filter operating to extract one sideband from the output of said mixer means lower sideband if in the base station's transmitter the upper sideband from said first mixer means is used and vice versa, demodulator means adapted to receive the selected channel signal and mix with the auxiliary frequency signal, means of a low pass filter connected to a low frequency output stage operating to receive and amplify the demodulated voice frequency signal, said transmission system comprising in the substations transmitter means, including means to generate a single sideband signal with suppressed carrier, the frequency of which being a $n$th subharmonic of the conversion frequency utilized in one of the substation receiver's conversion stages preceding the filter where the separation of the message signals from the auxiliary frequency takes place, said carrier frequency signal being produced in the generator means connected to said conversion stage, said carrier frequency being also a $(n-1)$th subharmonic of the frequency distance—equal for all channels, hereafter referred to as the duplex distance frequency—between the suppressed carrier frequencies of a channel's transmit and receive signals, conversion means for receiving and increasing the frequencies of said single sideband signals in successive mixer stages connected to filters operating to extract one sideband of the preceding mixer stage and suppressing the conversion frequency, the single sideband signal in said mixer stages being successively mixed with: the auxiliary frequency signal—as decreased in frequency and extracted in the substation's receiver—the previously said low frequency signal utilized in the receiver for the selection of message channel, the upper sideband from the mixer product to be chosen if in the base station's transmitter the upper sideband from said first mixer is used and correspondingly the lower sideband if lower sideband from said first mixer is used—and the conversion frequencies applied in the receiver's conversion stages preceding the filters operating to separate the message signals and the auxiliary frequency signal—except the conversion frequency which is a $n$th harmonic of the carrier frequency signal utilized to produce said initial single sideband signal with suppressed carrier, means to transmit said generated and in frequency increased single sideband signal with suppressed carrier, said transmission system comprising in the base station means to receive the signals from the substations simultaneously on all channels, including conversion means for decreasing the frequencies of said signals, generating means for producing a first conversion frequency signal, a first mixer to receive the substations signals and mix these with said first conversion frequency signal, a second mixer to receive a signal with a frequency equal to the difference between the auxiliary frequency and the duplex distance frequency-generated in the previously said generator means in the base station producing a set of accurate and stable conversion frequencies—and mix said signal with said first conversion frequency signal, a first filter connected to the said first mixer operating to extract the lower sideband from the output of the mixer, a second filter connected to the second mixer extracting the lower sideband from said mixer output, a third mixer to receive the substations signals extracted in said second filter, a set of filters connected to the third mixer—one filter for each channel—each of said filters operating to receive and separate one channel signal from the other signals, a demodulator connected to each filter to receive the signal from the filter output and mix this with the appropriate low frequency carrier signal produced in the base station and also utilized in the base transmitter's first modulator stages, filter and low frequency amplifier means connected to each demodulator stage to receive and amplify the demodulated signals.

2. The radio transmission system of claim 1 wherein in the substation's receiving means said low frequency signals—one designated to each message channel—are chosen in such a way that the signal selected in said band pass filter is separated by a fixed frequency space of at least 50 kHz from the extracted and in frequency decreased auxiliary frequency signal, wherein said receiving means includes mixer means connected to said band pass filter, said mixer means adapted to receive the selected channel signal and mix this with the auxiliary frequency signal, means of a band pass filter having a band width equal to the net band width of a message channel operating to extract the signal from the output of said mixer, means for generating a fixed low frequency signal, demodulator means adapted to receive said signal and mix with said low frequency signal, said demodulator being connected to a low frequency output stage operating to receive and amplify the demodulated voice frequency signal.

3. The radio transmission system according to claim 1 adapted to accomplish transmission from a multichannel transmitter to groups of one-channel receivers each receiver group adapted to one channel particular to that group, comprising transmitting means providing a transmitted signal which includes at least two voice message single sideband channel signals, and one unmodulated auxiliary frequency signal for simultaneous transmission to at least two receiver groups, said channels chosen out of a number of channels, said message signals being transmitted on channels separated by at least one channel width, whereas in said number of channels two neighboring channels partly overlap in frequency in such a way that corresponding band limits of two adjacent channels are separated by a frequency space less than the band width of one channel.

4. The radio transmission system of claim 1 comprising transmitter means for providing a transmitted signal which includes a plurality of voice message signals from at least two frequency channel bands and one unmodulated auxiliary frequency signal, said transmission system comprising groups of substations, substations of each group including receiving means adapted to receive signals from one of said frequency channel bands, including conversion means consisting of one single conversion stage preceding the filters operating to receive and separate the auxiliary frequency and the message signal bands, generating means to provide a conversion frequency for said single conversion stage, said conversion frequency and the frequencies of said frequency channel bands being chosen so that the channel band's image frequencies for two or more groups of substation's receivers are made to coincide or substantially coincide in the frequency spectrum and the image frequency of the auxiliary frequency signal to fall outside the channel bands.